(12) United States Patent
Ribeiro et al.

(10) Patent No.: US 11,788,681 B2
(45) Date of Patent: Oct. 17, 2023

(54) MOUNTING APPARATUS

(71) Applicant: UBICQUIA, INC., Fort Lauderdale, FL (US)

(72) Inventors: Claudio Santiago Ribeiro, Evanston, IL (US); Stephen D. Berry, Bastrop, TX (US)

(73) Assignee: Ubicquia, Inc., Fort Lauderdale, FL (US)

( * ) Notice: Subject to any disclaimer, the term of this patent is extended or adjusted under 35 U.S.C. 154(b) by 98 days.

(21) Appl. No.: 17/411,002

(22) Filed: Aug. 24, 2021

(65) Prior Publication Data
US 2022/0057044 A1 Feb. 24, 2022

Related U.S. Application Data

(60) Provisional application No. 63/069,582, filed on Aug. 24, 2020.

(51) Int. Cl.
*F16M 13/02* (2006.01)
*F21S 8/08* (2006.01)
*F21W 131/103* (2006.01)

(52) U.S. Cl.
CPC ........... *F16M 13/022* (2013.01); *F21S 8/086* (2013.01); *F16M 2200/028* (2013.01); *F21W 2131/103* (2013.01)

(58) Field of Classification Search
CPC .. F16M 13/022; F21S 8/086; F21W 2131/103
See application file for complete search history.

(56) References Cited

U.S. PATENT DOCUMENTS

| | | | | |
|---|---|---|---|---|
| 3,241,800 A | * | 3/1966 | Richter, III | F16L 3/137 248/230.9 |
| 4,664,771 A | * | 5/1987 | Docktor | C25D 11/005 248/229.16 |
| 5,463,973 A | * | 11/1995 | Tait | G09F 17/00 403/3 |
| 5,702,081 A | * | 12/1997 | Gallemore, II | G09F 7/18 248/219.4 |
| 6,065,722 A | * | 5/2000 | LeVasseur | F21V 21/08 248/230.8 |
| 6,486,399 B1 | * | 11/2002 | Armstrong | H05K 5/0204 439/535 |

(Continued)

*Primary Examiner* — Monica E Millner
(74) *Attorney, Agent, or Firm* — Daniel C. Crilly; Thomas J. Satagaj

(57) ABSTRACT

A mounting bracket includes a base member and at least two side members. The base member defines at least two separated edge portions. A first side member is attached to a first edge portion of the base member. The first side member extends away from the base member at a first angle and defines an exposed arched edge having a first radius. A second side member is attached to a second edge portion of the base member. The second side member extends away from the base member at a second angle and defines an exposed arched edge having a second radius. The bracket may also include binding teeth, which may be formed from the exposed corners of the arched edges of the first and second side members. The bracket may form part of a mounting system that also includes a mechanism for binding the bracket to a structure.

20 Claims, 8 Drawing Sheets

(56) References Cited

U.S. PATENT DOCUMENTS

| | | | | |
|---|---|---|---|---|
| 6,581,891 | B1* | 6/2003 | Byrd | A47B 5/04 |
| | | | | 248/230.8 |
| 6,766,992 | B1* | 7/2004 | Parker | F16M 13/022 |
| | | | | 248/219.3 |
| 7,424,992 | B1* | 9/2008 | Dziedzic | E04H 12/20 |
| | | | | 248/219.4 |
| 7,810,265 | B2* | 10/2010 | Beatty | G09F 7/18 |
| | | | | 40/607.14 |
| 7,810,783 | B2* | 10/2010 | Tsay | B62D 1/043 |
| | | | | 248/230.8 |
| 7,883,065 | B2* | 2/2011 | Nelson | F16M 11/2021 |
| | | | | 248/70 |
| 10,885,816 | B2* | 1/2021 | Peters | G09F 17/00 |
| 11,296,395 | B2* | 4/2022 | Willemsen | H05K 5/0204 |
| 11,425,828 | B2* | 8/2022 | Moosburger | H02G 3/32 |
| 11,549,640 | B2* | 1/2023 | Tsorng | F16M 11/22 |
| 11,555,513 | B2* | 1/2023 | Tsorng | F16M 13/02 |
| 2008/0239632 | A1* | 10/2008 | Wayman | H05K 5/0204 |
| | | | | 361/600 |
| 2009/0065669 | A1* | 3/2009 | Elkins | H01Q 1/12 |
| | | | | 248/218.4 |

* cited by examiner

REAR SIDE
RIGHT SIDE
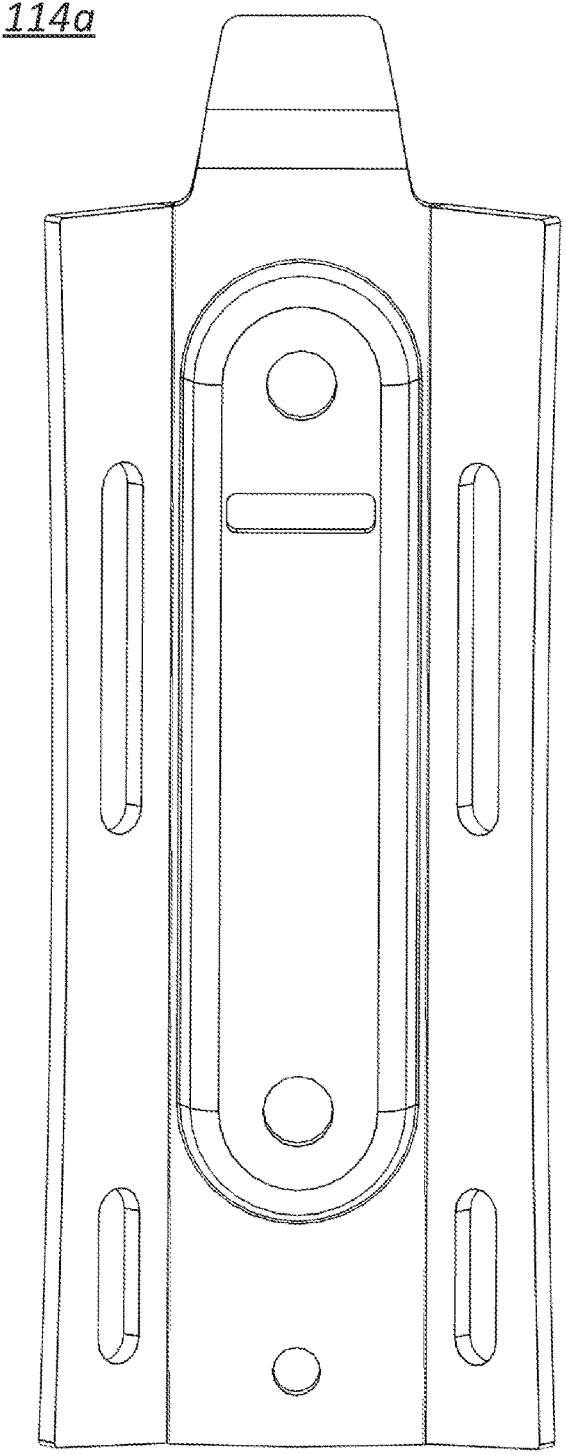
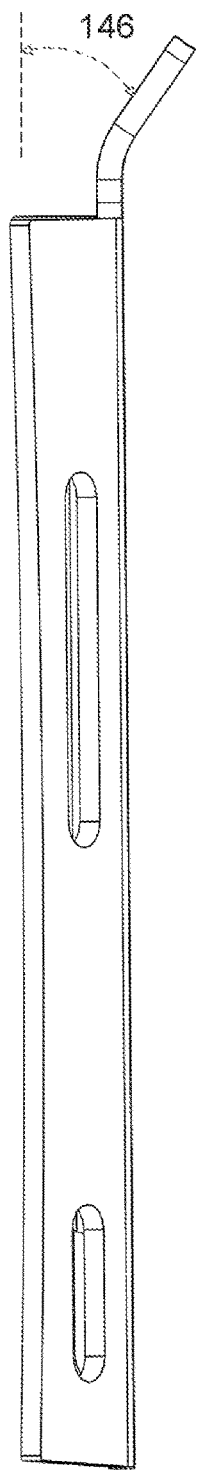
*Fig. 4D*
*Fig. 4E*

_114a_

_114a_

114a

MOUNTING APPARATUS

CROSS-REFERENCE TO RELATED APPLICATIONS

The present application claims priority upon and the benefit of U.S. Provisional Application No. 63/069,582, which was filed on Aug. 24, 2020 and is incorporated herein by reference in its entirety.

TECHNICAL FIELD

The present disclosure relates generally to mounting apparatus and, more particularly, to a mounting apparatus for securing an electronic device to an object, such as a utility pole.

BACKGROUND

Utility poles have been known since at least the advent oil-filled lamps for lighting, and the standardized use of such poles have been known at least since the implementation of generated electricity, electronic communications (e.g., telegraph and telephone systems), and mechanized roadway travel. Utility poles, when constructed in areas where people pass or gather, have been used to post advertisements, public notices, signage, and other paraphernalia.

Standard utility poles in the United States and other countries may, when installed, stand vertically twenty to one hundred twenty feet (20 ft.-120 ft.) or more above the ground. Utility poles may be spaced seventy-five to three-hundred feet (75 ft.-300 ft.) or more apart. Such utility poles may support streetlights, central power supply infrastructure such as transformers, power cables, multimedia communications cables, and the like.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The apparatus, method, and system embodiments described in this disclosure (i.e., the teachings of this disclosure) enable power companies, municipalities, and others to quickly and predictably secure an electronic device or other mountable device to a structure, such as a vertically standing pole. The mounting apparatus and mounting systems described in the present disclosure include a particular multi-member bracket. Other structures such as screws, bolts, nuts, straps, and certain mountable devices may also be included.

According to one exemplary embodiment, a mounting system to secure an electronic or other device to a structure includes a multi-member bracket. In some cases, the bracket has a base member and at least two angled side or wing members. The side members may be integrally or otherwise attached to separated edge portions of the base member. The side members extend away from the base member at respective angles, which may be the same or different. For example, the bracket may have a generally tri-fold shape. According to one embodiment, the base member may be generally rectangularly shaped and the side or wing members may be integrated with respective elongated edge portions of the base member. The bracket may include a plurality of binding teeth arranged to contact the structure when the mounting device is installed. Each side member may define an aperture sized and shaped to receive a binding mechanism, wherein the binding mechanism is arranged to fixedly secure the bracket to the structure when the bracket is installed. The binding mechanism may be, for example, a strap, a tie-wrap, a belt, or a rope. The bracket's base member may include at least one mating element, such as a tab, to receive the mountable device, which may be an electronic device that includes a complementary mating recess or aperture to receive the bracket's tab. The mounting device may also include a second binding mechanism arranged to removably secure the mountable device to the bracket.

The multi-member bracket may be formed from a single piece of material, such as metal or plastic. In such a case, the bracket may be stamped, pressed, bent, or machined from the single piece of material. Additionally, each side member of the bracket may be integrated with the base member at an angle of between about thirty degrees (30°) and about forty-five degrees (45°). An exposed edge of each of side member may be arched with a radius of between about one inch and about fourteen inches. In some of these and other embodiments, the bracket's teeth are formed by the corners of the side members' exposed edges.

In some embodiments, the bracket may include at least one directional legend, which is usable for properly orienting the bracket during installation. In some cases, the least one mating element arranged to receive the mountable device is a tab integrated with the bracket. And in these and other cases, the second binding mechanism may be a threaded aperture arranged to receive a certain type of bolt.

A method to secure a mountable device to a structure may include aligning a bracket of a mounting system on the structure, where the mounting system includes the bracket, a plurality of binding teeth formed in the bracket, at least one aperture arranged to receive a first binding mechanism, at least one mating element arranged to receive the mountable device, and a second binding mechanism arranged to removably secure the mountable device to the bracket. Once the bracket is aligned, the bracket is secured to the structure with the first binding mechanism such that at least some of the binding teeth are in direct contact with the structure. After the bracket is secured to the structure, the mountable device is positioned upon the mating element(s) and removably secured to the bracket by way of the second binding mechanism.

In an alternative embodiment, the structure may be a vertically standing pole such as, for example, a utility pole arranged to support at least one of electric power lines, cable multimedia lines, telephone lines, a luminaire, and a support for a luminaire. In these and other cases, the first binding mechanism may include at least one steel strap and securing the bracket to the structure may include passing the strap(s)

though the bracket's aperture(s) and wrapping the strap(s) around the pole. In other embodiments, the second binding mechanism may include at least one threaded member and securing the mountable device to the bracket includes tightening at least one of a certain type of threaded bolt or a certain type of threaded nut into the at least one threaded member.

In a further embodiment, a system includes: a pole; a streetlight luminaire coupled to the pole; a mounting bracket fixedly secured to the pole; and a mountable electronic device positioned upon the mounting bracket and electrically coupled to the streetlight luminaire. In this embodiment, the mounting bracket includes a plurality of binding teeth formed in the bracket, wherein at least some of the binding teeth are in direct contact with the pole; at least one aperture receiving a first binding mechanism that binds the mounting bracket to the pole; at least one mating element that receives the mountable electronic device; and a second binding mechanism that removably secures the mountable electronic device to the bracket.

The mountable electronic device may be at least one of an air quality sensor, an environmental sensor, a motion detection sensor, a water sensor, an orientation sensor, a vibration sensor, a tilt sensor, and a microphone. In some cases, the pole may be a utility pole arranged to support at least one of electric power lines, cable multimedia lines, telephone lines, a luminaire, and a support for a luminaire. The electrical coupling in some embodiments includes at least one power conduit and at least one communications conduit. In these and other such cases, the at least one communications conduit is arranged for communication via a digital addressable lighting interface (DALI) protocol.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 4D is a rear view of the bracket shown in FIG. 4A.

FIG. 4E is a right side view of the bracket shown in FIG. 4A.

DETAILED DESCRIPTION

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, certain structures associated with vertically standing utility poles log have not been shown or described in detail to avoid unnecessarily obscuring more detailed descriptions of the embodiments.

The apparatus, method, and system embodiments described in this disclosure (i.e., the teachings of this disclosure) provide certain stakeholders (e.g., power companies, municipalities, and others) with apparatus and guidance to quickly and predictably secure a device, such as an electronic monitoring or other device, to a structure, such as a pole, guard rail, or other structure. The mounting apparatus and mounting systems described in the present disclosure include a particular bracket. Other elements such as screws, bolts, nuts, strapping, and the electronic or other devices to be mounted may also be included.

Figure 1:
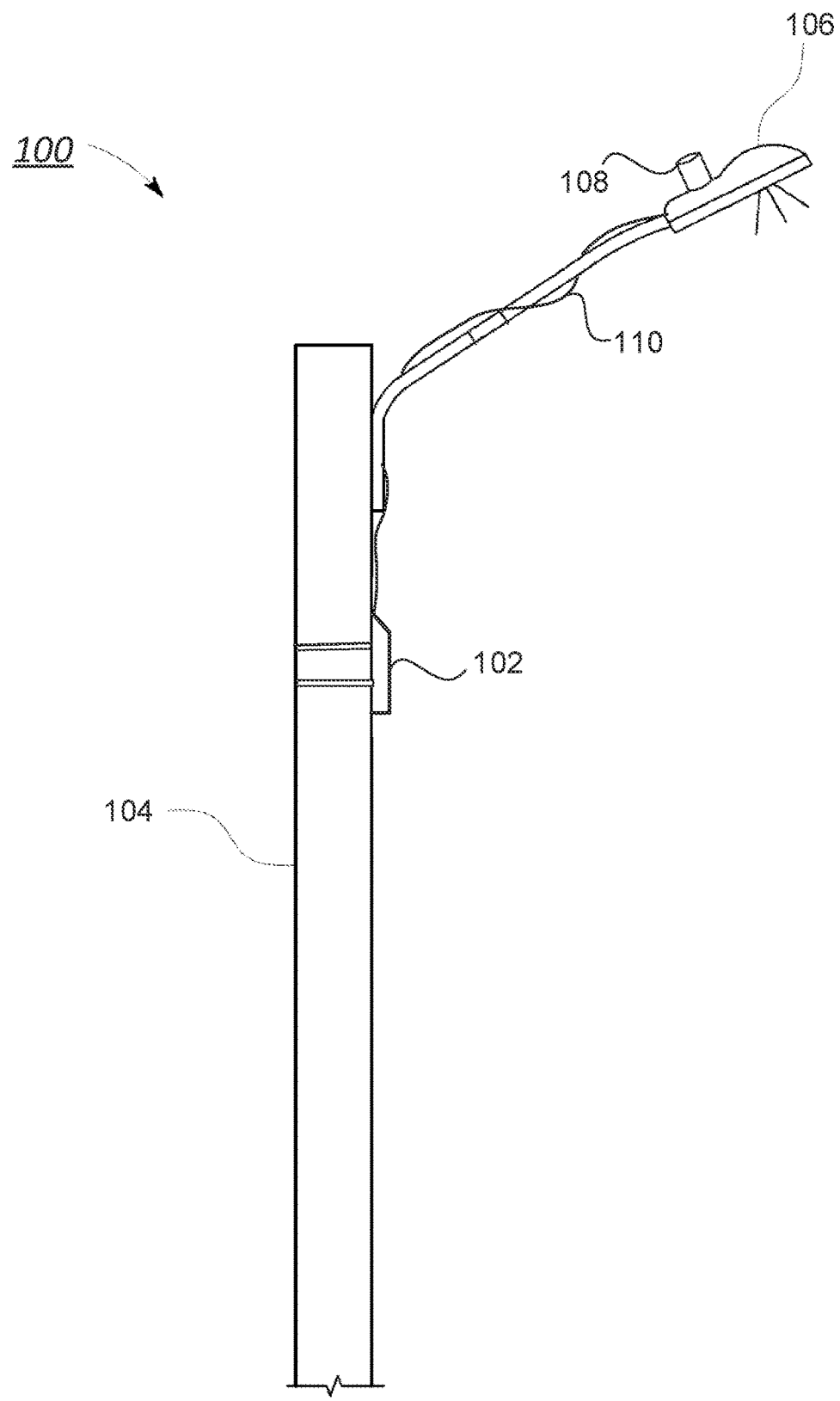
FIG. 1 is a system level deployment having at least one electronic device secured to a structure, such as a vertically standing utility pole.

FIG. 1 is an exemplary system level deployment 100 having at least one mountable device 102 secured to a structure, such as a vertically standing utility pole 104. In the exemplary embodiment, a support arm integrated with the utility pole 104 supports a luminaire 106. Operations of the luminaire 106 may be controlled by a smart controller 108. Optionally, the mountable device 102 is electrically, communicatively, or electrically and communicatively coupled to the smart controller 108 via one or more conductive conduits 110.

The system level deployment 100 embodied in FIG. 1 includes at least one utility pole 104; however, the system may include multiple poles, some or all of which may have one or more mountable devices 102. The utility pole 104 of FIG. 1 includes a streetlight fixture. The streetlight fixture includes the support arm and a luminaire 106. In many cases, streetlight fixtures are coupled to or otherwise arranged as part of a system of streetlight utility poles, each streetlight fixture having a light source. Each light source, light fixture, and light fitting, individually or along with their related components, may in some cases be interchangeably referred to as a luminaire, a light source, a streetlight, a streetlamp, or some other such suitable term.

Though not expressly shown in FIG. 1, the system level deployment 100 may include a plurality of utility poles 104 arranged in one or more determined geographic areas, and each utility pole 104 may or may not have at least one light source positioned in a fixture. The utility poles 104 are in some cases at least twenty feet above ground level, and in at least some cases, the luminaires 106 are between about 20 feet and 40 feet above ground level. In other cases, the streetlight fixtures may of course be lower than 20 feet above the ground or higher than 40 feet above the ground. The system of utility poles 104, streetlight fixtures, streetlight sources, or the like in a system level deployment 100 may be controlled by a municipality or other government agency. In other cases, the system utility poles 104, streetlight fixtures, luminaires 106, smart controllers 108, or the like in a system level deployment 100 is controlled by a private entity (e.g., private property owner, third-party service contractor, or the like). In still other cases, a plurality of entities share control of a system of utility poles 104, streetlight fixtures, luminaires 106, smart controllers 108, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of utility poles 104, streetlight fixtures, luminaires 106, smart controllers 108, or the like can be granted some control such as in a neighborhood, around a hospital or fire department, in a construction area, or in some other manner.

In the system level deployment 100 of FIG. 1, any number of streetlight fixtures or luminaires 106 may be arranged with a connector that is compliant with a roadway area lighting standard promoted by a standards body. The connector permits the controlling or servicing authority of the system to competitively and efficiently purchase and install smart controllers 108 on each streetlight fixture. In addition, or in the alternative, the standardized connector in each streetlight fixture permits the controlling or servicing authority to replace conventional light sensors with smart controllers 108, which may be deployed to facilitate operations of a mountable device 102.

The utility pole 104 may stand at any suitable height above ground level. Utility poles 104 may be substantially formed of wood, fiberglass, concrete, steel, galvanized steel, aluminum, a composite, a resin, or any other suitable material. The utility poles 104 may have a top-down cross-section that is substantially circular (i.e., a cylindrical or generally or substantially cylindrical utility pole), square, rectangular, triangular, hexagonal, octagonal, or with some other cross section. The utility poles 104 discussed in the present disclosure may be arranged to support at least one of electric power lines, electric power transformers or other power infrastructure equipment, multimedia cable lines (e.g., coaxial electrically conductive cables, fiberoptic cables, or the like), dedicated telephone lines, a luminaire, a support for a luminaire, and other useful structures. In the present disclosure, a utility pole 104 may interchangeably be referred to as a transmission pole, telephone pole, telecommunication pole, power pole, hydro pole, telegraph pole, or telegraph post, a multi-purpose pole, or any other like name.

In the present disclosure, a mounting bracket and the mountable device it secures may be affixed vertically, such as to a vertically standing utility pole 104, or horizontally, such as to a guard rail. For example, a utility pole 104 may be installed, erected, planted, secured to the ground in a permanent or semi-permanent location, and the like. In some cases, utility poles are installed by 'planting' the pole in a hole (e.g., locating the pole in a hole that is six feet or more below surface grade), bolting or otherwise affixing the pole to a foundational structure, and the like.

The mountable device 102 may be any desirable device or devices. That is, a single utility pole 104 may support one mountable device 102, two mountable devices 102, or some other plurality of mountable devices 102. In some cases, the mountable device 102 may be an electronic device, such as an air quality sensor, an environmental sensor, a motion detection sensor, a water sensor, an orientation sensor (e.g., tilt sensor), a vibration sensor, a lightening sensor, a microphone, a communication device, or any other electronic device.

Where the mountable device 102 is an electronic device, the mountable device 102 may generate or otherwise provide its own power (e.g., solar power, battery power, induced power, vibration-generated power, or the like). In other cases, the mountable device 102 receives power from the luminaire 106, the smart controller 108, or some other power source via, for example, the conductive conduit 110.

The conductive conduit 110 may be included in some embodiments and excluded in other embodiments. The conductive conduit 110 may be arranged to pass power, data, or power and data. For example, in some cases, the conductive conduit 110 is a multiconductor electrical conduit formed of copper or another electrically conductive core encased in a non-conductive jacket. Such a conductive conduit 110 may be used to pass electrical power, data signals, or electrical power and data signals. In other cases, the conductive conduit 110 is a fiberoptic cable. In these cases, light signals may be arranged to pass data. Additionally, or alternatively, a fiberoptic cable may also pass light that is converted to electrical energy (e.g., via one or more photocells) for use by the mountable device 102.

In at least some cases, the conductive conduit 110 is arranged as a power conduit and further arranged as a data communications conduit. The conductive conduit 110 may be arranged to pass power, pass data, or pass power and data via a digital addressable lighting interface (DALI) protocol. In such case, the conductive conduit 110 will have at least one pair of electrically conductive conduits (e.g., solid or stranded wires). The conductive conduit 110 may suitably include at least two pairs of wires. Power and data may or may not be passed on the same pair of wires.

The smart controller 108 may, for example, be or otherwise include electronic circuitry that controls operations of the luminaire 106. Such control may include generating and passing signals to turn the light source on during times of ambient darkness and off during times of ambient light. The smart controller may include computing resources (e.g., a processor, memory, input/output (I/O), and the like). The smart controller may further include location circuits (e.g., global positioning system (GPS) or other corresponding location circuits) circuits, telecommunications circuits, and other suitable circuits. In at least some cases, the smart controller 108 may include one or more small cell circuits, one or more cameras, artificial intelligence engines, and the like.

Figure 2A:
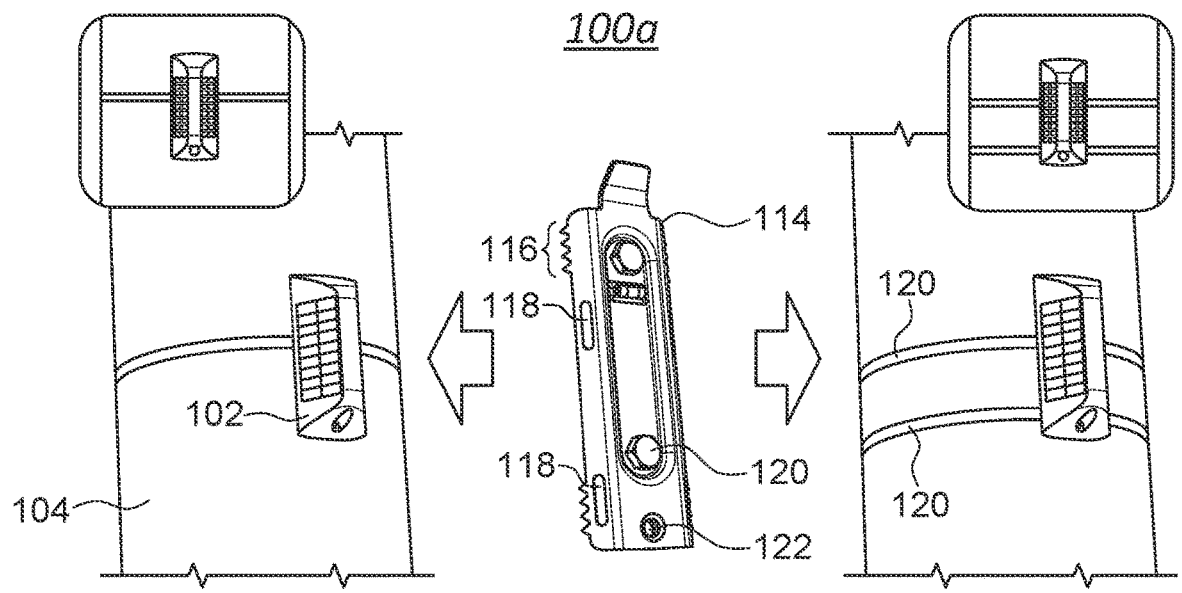
FIG. 2A is a first sub-method embodiment to affix a mounting bracket or portion thereof to a structure.
Figure 2B:
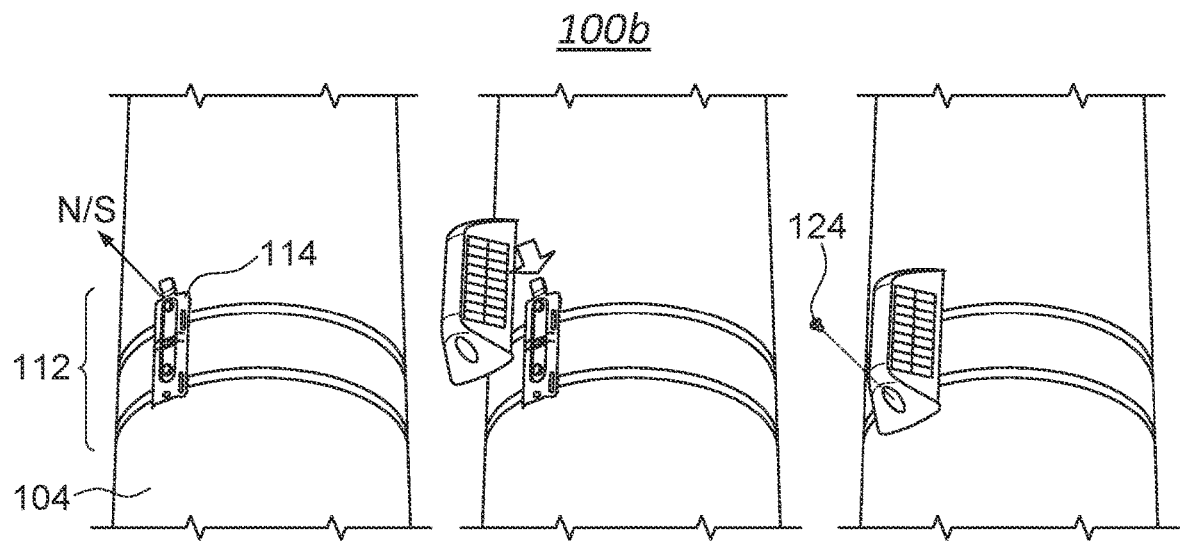
FIG. 2B is a second sub-method embodiment to secure a mountable device to the mounting bracket and/or the structure.

FIG. 2A illustrates a first exemplary process 100a for using a mounting system 112 to affix or secure a mountable device 102 to a structure, such as a utility pole 104. FIG. 2B illustrates a second exemplary process 100b for affixing or securing an electronic device or other mountable device 102 to a mounting bracket 114 of the mounting system 112. In the present disclosure, FIGS. 2A-2B may be collectively referred to as FIG. 2. Structures earlier identified are not repeated for brevity. In some cases, where clearly evident, each and every instance of a particular structure or element is not provided with a reference number to avoid unnecessarily cluttering the figure and obfuscating the subject matter disclosed therein.

In the exemplary process depicted in FIG. 2A, a multi-member bracket 114 is installed on a structure, such as a vertically standing utility pole 104. The bracket 114 may have a generally rectangular or square shape. Alternatively, the bracket 114 may have a generally oval shape, a generally circular shape, or any other desired shape. The remaining disclosure describes use of a bracket 114 for securing a device 102 to a structure, although such disclosure is not so limited. A plurality of binding teeth 116 formed in the bracket 114 are arranged to contact the structure when the bracket 114 is installed. At least one aperture 118 in the bracket 114 is arranged to receive a first binding mechanism 120. The first binding mechanism 120 is arranged to fixedly secure the bracket 114 to the structure when the bracket 114 is installed. The first binding mechanism 120 may include one or more metal straps (e.g., steel, plastic, titanium, or some other material). Additionally, or alternatively, the first binding mechanism 120 may include a threaded means such as a screw, a lag bolt, a threaded rod, a nut that receives a threaded member through an aperture in the bracket 114. In yet other embodiments, the first binding mechanism 120 may alternatively include some other binding means such as a rod and cotter pin, a nail, a clamp, or any other suitable binding mechanism.

FIG. 2B also illustrates an embodiment of a mounting system 112. In this case, the mounting system 112 includes the bracket 114, the first binding mechanism 120 (e.g., binding straps and lag bolts), and a second binding mechanism 124, which in this case includes a screw that secures the mountable device 102 to the bracket 114.

In FIG. 2B, the bracket 114 is secured to the structure (e.g., utility pole 104) in an orientation that is substantially perpendicular to the ground. In some cases, the bracket 114 is oriented to face substantially north or substantially south (N/S). In some cases, the bracket 114 is oriented to face substantially in another direction, such as east and west. Such orientation of the bracket 114 transfers to a corresponding orientation of the mountable device 102.

Also in FIG. 2B, the bracket 114 receives the mountable device 102, and a second binding mechanism 124 is arranged to removably secure the mountable device 102 to the bracket 114. In the embodiment of FIG. 2, a second aperture 122 in the bracket 114 (e.g., a threaded aperture) is arranged to receive the second binding mechanism 124. The second binding mechanism 124 may include a screw, bolt, nut, or some other binding means to secure the mountable device 102 to the structure.

As illustrated in FIG. 2, the mounting system, which includes the bracket 114, may be secured to a utility pole 104 or other structure at any suitable time, and as much care as desired may be taken by the installer to acceptably orient the mounting device on the structure. Subsequently, the same installer or a different installer may quickly and easily install the mountable device 102 onto the structure (e.g., via the bracket 114) using a single mounting means (e.g., mechanically coupling the second binding mechanism 124 with the second aperture 122). This simple, two-part installation method permits servicing, replacement, and other actions associated with the mountable device 102 at the same time, or at different times.

Figure 3:
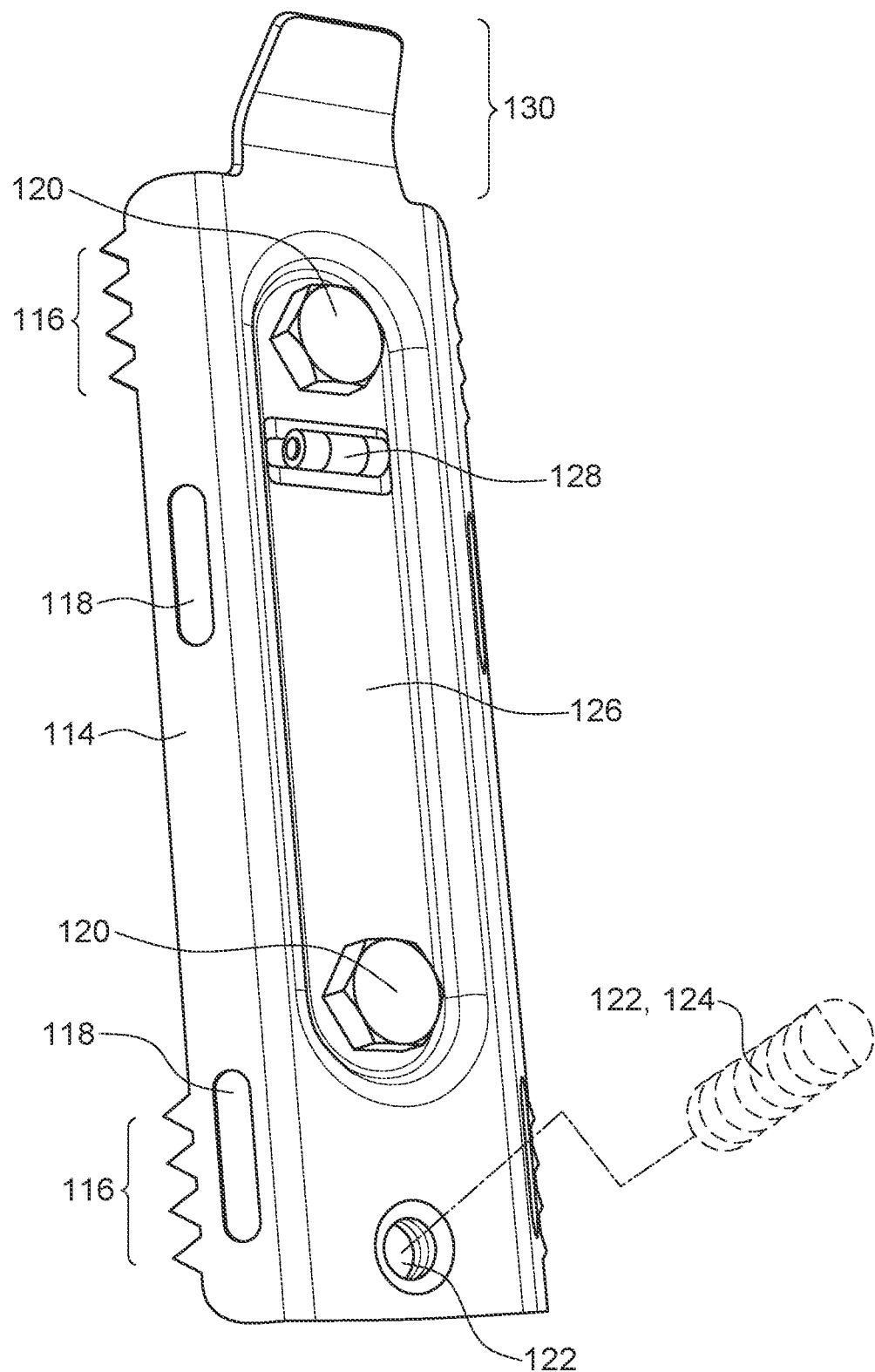
FIG. 3 is one exemplary embodiment of a bracket and certain other portions of a mounting system.

FIG. 3 is an embodiment of a bracket 114 and certain other portions of a mounting system 112. In the embodiment of FIG. 3, the first binding mechanism 120 includes one or more lag bolts, but any metal straps are omitted. Metal straps may be deployed on structures of nearly any material while screws, nails, lag bolts, or other such penetrating means may be deployed on structures formed of a penetrable material such as wood. Other elements of the bracket 114, such as binding teeth 116 and apertures 118, are not further discussed with reference to FIG. 3 for brevity.

The embodiment of FIG. 3 illustrates a second aperture 122 that receives, cooperates with, or is otherwise a part of the second binding mechanism 124. In some cases, the second aperture 122 receives a screw, as illustrated in FIG. 2. In other cases, the second aperture 122 receives a threaded rod or other protruding means, which passes entirely or partially through a mountable device 102 and receives a nut or other second binding mechanism 124 to secure the mountable device 102. In still other cases, the threaded rod, post, or other protruding means is integrated with the bracket 114 in some other way.

A recessed well 126 provides clearance for the first binding mechanism 120 when such mechanism is embodied, for example, as one or more bolts, screws, or the like. In these cases, the bolt heads, screw heads, nuts, or other such means occupy a portion of the recessed well, but do not contact or restrict placement of the mountable device 102 on the bracket 114. In the embodiment of FIG. 3, the recessed well 126 has small enough depth to permit binding straps (e.g., first binding mechanism 120) to pass below the recessed well 126. In other cases, the recessed well 126 is deeper and includes additional apertures that permit binding straps to pass through the recessed well 126.

A leveling mechanism 128, such as a line, a bubble level, or some other such indicator means, may be optionally included to help an installer orient the bracket 114 in an acceptable way.

In some cases, the bracket 114 includes a mating element 130 arranged to receive the mountable device 102. In the embodiment of FIG. 3, the mating element 130 is formed as a tab. In other cases, the mating element 130 may be formed as a plurality of tabs, one or more hooks, one or more apertures, or any other like means. In some cases, the mating element 130 may be a tab integrated with the bracket 114, and in other cases, the mating element 130 may be a tab bolted, welded, or otherwise coupled to the bracket 114. In the embodiment of FIG. 3, the mating element 130 is integrated with the bracket 114 and protrudes from the bracket 114 in a direction away from the structure to which the bracket 114 will be mounted. In some cases where the mating element 130 is a tab, the tab is between about one quarter inch (0.25 in.) wide and about two inches (2 in.) wide. In at least one case, the tab is about one inch (1 in.) wide. In some cases, the tab integrated with the bracket 114 is between about one quarter inch (0.25 in.) tall and about two inches (2 in.) tall. In at least one case, the tab is about one inch (1 in.) tall. In some cases, the tab protrudes from the bracket at an angle of between about ten degrees (10°) from vertical and about forty-five degrees (45°) from vertical.

In at least one case, the mating element 130 is an aperture. In such a case, the mountable device 102 may include a tab, hook, or other protruding means arranged to cooperate with the aperture.

Figure 4A:
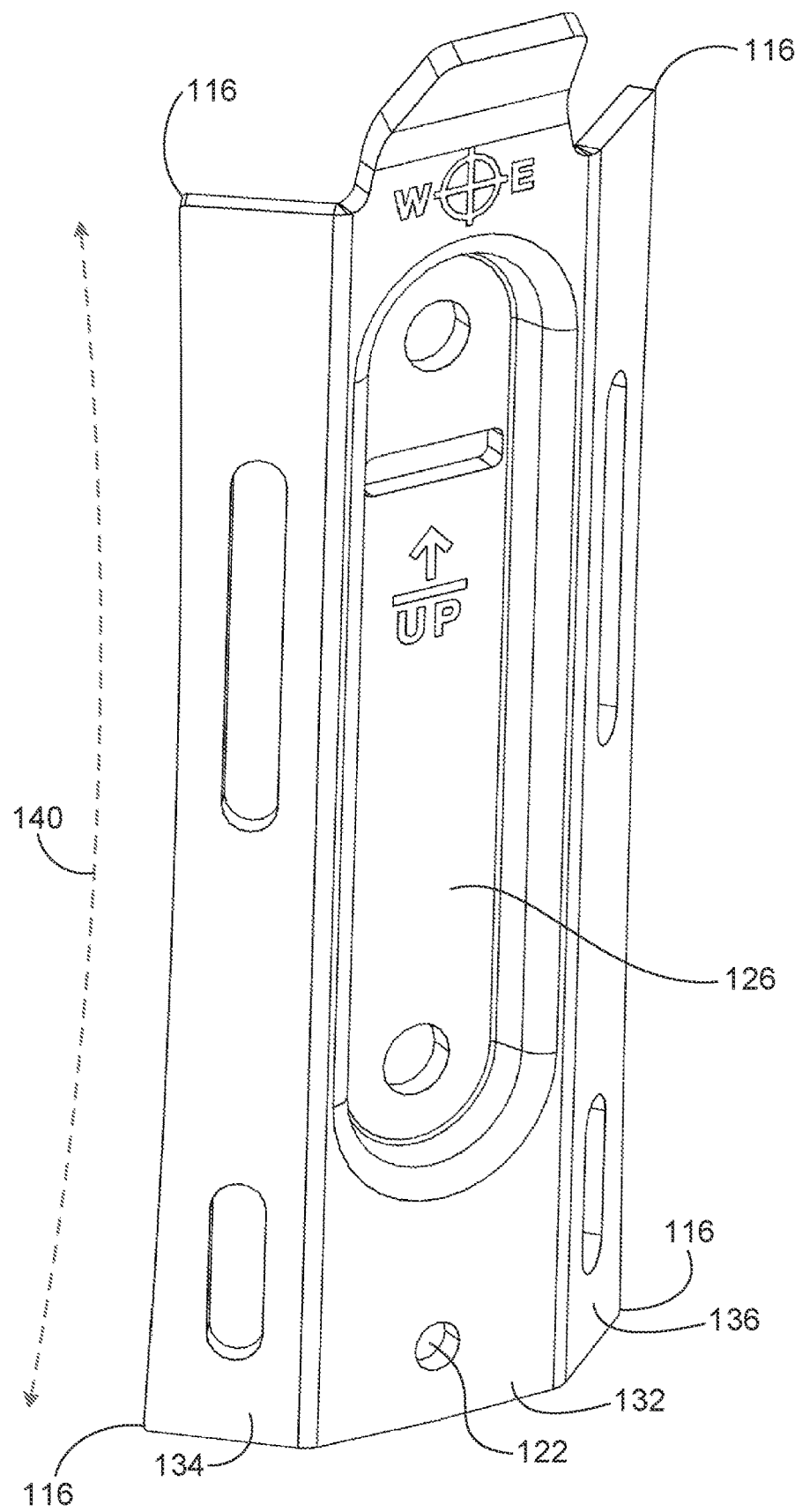
FIG. 4A is a front left perspective view of an alternative embodiment for a bracket forming part of a mounting system.
Figures 4B, 4C:
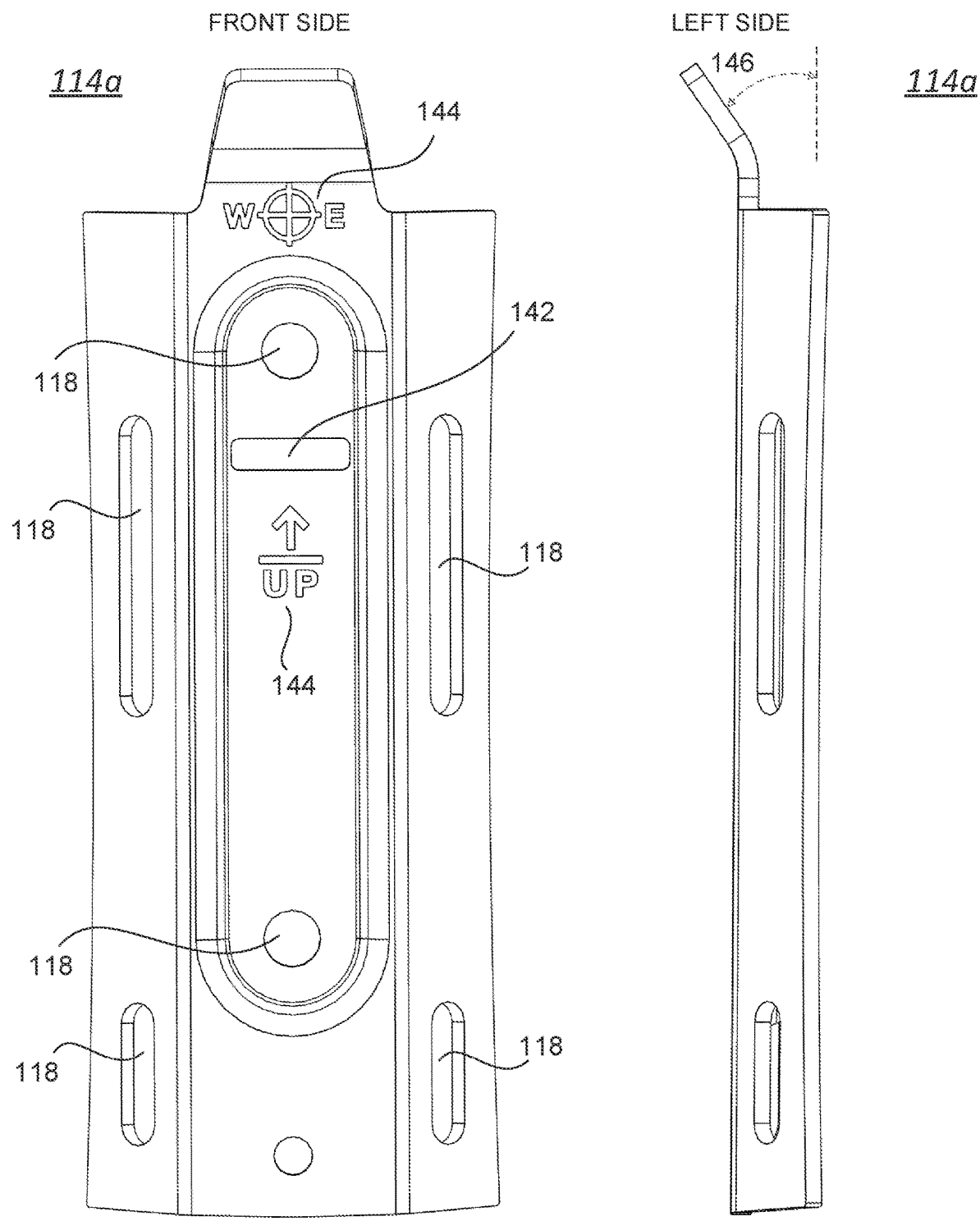
FIG. 4B is a front view of the bracket shown in FIG. 4A.
FIG. 4C is a left side view of the bracket shown in FIG. 4A.
Figure 4F:
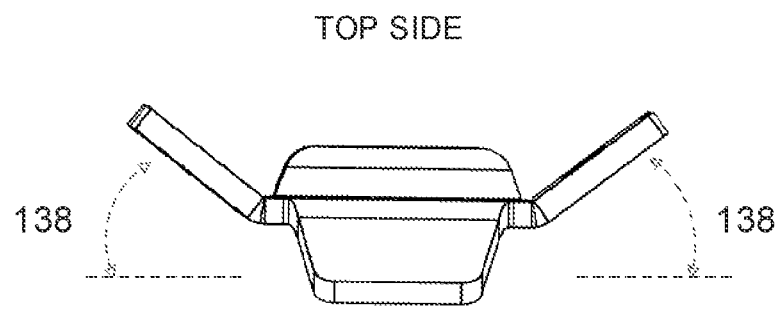
FIG. 4F is a top view of the bracket shown in FIG. 4A.
Figure 4G:
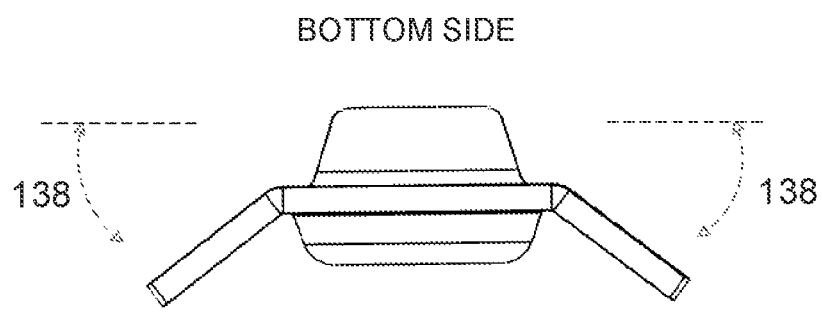
FIG. 4G is a bottom view of the bracket shown in FIG. 4A.
Figure 4H:
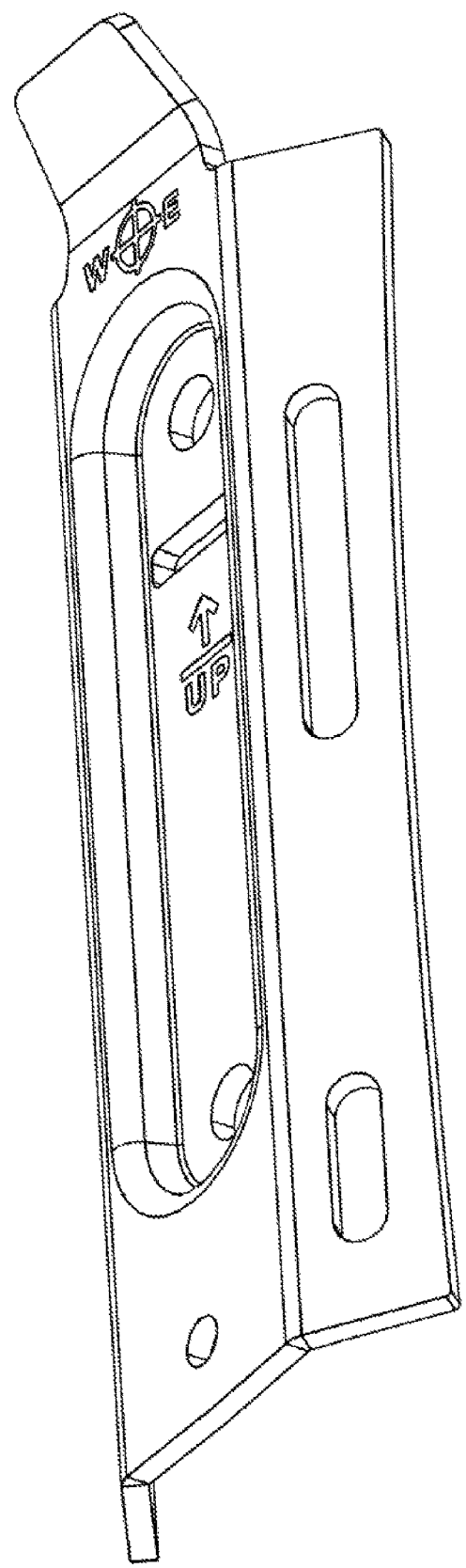
FIG. 4H is bottom right perspective view of the bracket shown in FIG. 4A.

FIG. 4A is a front left perspective view of an alternative bracket 114a in accordance with another exemplary embodiment of the present disclosure. FIG. 4B is a front view of the alternative bracket 114*a*. FIG. 4C is a left side view of the alternative bracket 114*a*. FIG. 4D is a rear view of the alternative bracket 114*a*. FIG. 4E is a right side view of the alternative bracket 114*a*. FIG. 4F is a top view of the alternative bracket 114*a*. FIG. 4G is a bottom view of the alternative bracket 114*a*. Finally, FIG. 4H is bottom right perspective view of the alternative bracket 114*a*. In the present disclosure, FIGS. 4A-4H may be collectively referred to as FIG. 4. Structures earlier identified are not repeated for brevity. The following discussion with respect to FIG. 4 is appropriately presented in view of one or more of FIGS. 4A-4H.

The alternative bracket 114*a* is generally similar to the bracket 114 described above with respect to FIGS. 2 and 3, except that the side members 134, 136 flare or fold out from the base member 132 at angles between 90 degrees and 180 degrees or between zero degrees and 90 degrees, depending on the reference axis, and the exposed edges of the side members 134, 136 are arched. In some cases, the two brackets are interchangeable. In other cases, desirable features of one bracket may lead to use of such bracket, or undesirable features of one bracket may lead to use of the other bracket.

The brackets 114, 114*a* of the present disclosure may have general dimensions of between about two inches (2 in.) to twenty-four inches (24 in.) in height, which is the vertical dimension when the mounting bracket 114, 114*a* is installed vertically on or to a structure; between about one inch (1 in.) and about fourteen inches (14 in.) in width, which is the lateral dimension when the mounting bracket 114, 114*a* is installed vertically on or to the structure; and between about one-eighth inch (0.125 in.) and about six inches (6 in.) in depth, which is the distance extending outward from the structure when the mounting bracket 114, 114*a* is installed on or to the structure. In at least one embodiment, the bracket 114, 114*a* has dimensions of about five inches (5 in.) in height, two inches (2 in.) in width, and about one-half inch (0.5 in.) in depth. Other dimensions are of course contemplated.

The brackets 114, 114*a* of the present disclosure have a base member 132, a first side member 134 attached to (e.g., integrated with) a first edge portion of the base member 132, and a second side member 136 attached to (e.g., integrated with) a second edge portion of the base member 132. In some cases, the base member 132 and the side members 134, 136 have generally rectangular shapes, although other shapes may be used. The side members 134, 136 may be integrated with or secured to (e.g., welded or adhered to) opposing, separated edges of the base member 132. In some cases, the bracket members 132, 134, 136 are formed from a single piece of material. In other cases, the bracket members 132, 134, 136 are formed from separate and distinct pieces of material and then interconnected.

In some cases, the bracket's side members 134, 136 are each integrated at a respective or substantially identical angle 138 from the base member 132, which is greater than about zero degrees (0°) and less than about ninety degrees (90°) (i.e., between about zero and 90 degrees). More specifically, in some embodiments, the bracket's side members 134, 136 are integrated at an angle 138 from the base member 132, which is greater than about fifteen degrees (15°) and less than about seventy-five degrees (75°). In these or other cases, the side members 134, 136 are integrated at an angle 138 from the base member 132, which is greater than about thirty degrees (30°) and less than about sixty degrees (60°). In at least some cases, the angle 138 is about forty-five degrees (45°).

The bracket 114*a* may include an elongated edge radius 140 or arch. More particularly, an exposed edge of each side member 134, 136 may be formed with a respective or substantially identical edge radius 140. In some cases, the edge radius 140 of each side member 134, 136 is between about one inch (1 in.) and about fourteen inches (14 in.). More specifically, the exposed edge of each side member 134, 136 may have an edge radius 140 of between about two inches (2 in.) and about four inches (4 in.).

The bracket 114*a* of FIG. 4 may include binding teeth 116 on opposing corners of the bracket's side members 134, 136. The binding teeth 116 are arranged to contact the structure to which the bracket 114*a* is mounted when the bracket 114*a* is installed. In the exemplary bracket 114*a* shown in FIG. 4A, the bracket 114*a* includes four binding teeth 116 and the teeth 116 are formed by the exposed edge corners of the side members 134, 136 of the bracket 114*a*. More or fewer teeth may be included in other embodiments.

The brackets 114, 114*a* of the present disclosure may be formed from a single piece of material. That is, the brackets 114, 114*a* may be stamped, pressed, bent, or machined from a single piece of material. Alternatively, in other embodiments, the brackets 114, 114*a* may be formed from two or more separate and distinct pieces of material. Materials used to construct the brackets 114, 114*a* may include one or more of steel, aluminum, plastic, a composite, or some other material in any suitable proportions. The material used to form the brackets 114, 114*a* may be between about one-sixteenth inches (0.0625 in.) and one-half inch (0.5 in.) thick. In some cases, bracket embodiments are formed of material about three-thirty-seconds of an inch (0.09375 in.) thick. Other thicknesses and dimensions are of course contemplated.

Along the lines of bracket 114, bracket 114*a* also includes a recessed well 126. In some cases, the recessed well 126 will include one or more cable pass-throughs 142. The cable pass-through 142 may be used to pass a conductive conduit 110 from the mountable device 102 to a luminaire 106, a smart controller 108, or some other structure such as a power source (e.g., wired power supply, solar cell circuitry, battery, or some other power source). In these or other cases, the cable pass-through 142 may pass a data-carrying medium to a data source or data sink, such as a computing device, a transceiver, a memory repository, or some other circuit. In some cases, the recessed well 126 includes the at least one aperture arranged to receive a binding mechanism 120 as discussed above with respect to FIGS. 2 and 3.

The bracket 114*a* of FIG. 4 may be arranged to include at least two apertures 118, at least four apertures 118, at least six apertures 118, or some other number of apertures to receive a binding mechanism 120. As illustrated in FIG. 4, the exemplary bracket 114*a* defines four elongated apertures 118 to receive a first banding strap 120, a second banding strap 120, or first and second banding straps 120. The pairs of apertures 118 defined by the side members 134, 136 of the bracket 114*a* are arranged (sized and shaped) to receive the banding straps 120, which may have different sizes and shapes. Each aperture 118 may include a non-slip, binding liner, such as a particular paint, epoxy, rubber, plastic, polymer, or some other material. In some cases, two banding straps 120 may be used to securely affix the bracket 114*a* to the structure (e.g., a utility pole 104). The banding straps 120 may be the same sized or different sized. In other cases, a single banding strap 120 sized narrowly (a weaker banding strap) or sized wider (a stronger banding strap) may be used.

In some embodiments, at least one aperture 118 is arranged to receive a binding mechanism 120 that is threaded. Such a binding mechanism 120 may include a screw, a bolt, a threaded rod, a nut, or some other mechanism.

Brackets 114, 114a may include one or more bubble levels or other levelling mechanisms 128. To support suitable alignment during installation of the mounting bracket 114, 114a, the bracket 114, 114a may include any suitable number or type of directional legends 144. For example, a first directional legend 144 may include compass rose. A second directional legend 144 may include a directional arrow (e.g., "UP") to help an installer property align and install the bracket 114, 114a even if the installer does not have the mountable device 102 that will later be installed. In some cases, a first installer will install the mounting systems 112, including brackets 114, 114a, on many structures at a first time, and a different installer will install the mountable devices 102 onto the brackets 114, 114a at a different time. In such embodiments, the directional legends may be used by the first installer to acceptably install the mounting systems 112 even in the absence of having a mountable device 102 to validate the proper installation.

The bracket 114, 114a may include a mating element 130 arranged to receive the mountable device 102. According to one embodiment, the mating element 130 is formed as a tab that protrudes outward and away from the structure to which the bracket 114, 114a is mounted. The tab protrudes outward at an angle 146. The angle 146 is greater than about zero degrees (0°) and less than about ninety degrees (90°). More specifically, in some embodiments, the angle 146 is greater than about fifteen degrees (15°) and less than about seventy-five degrees (75°). In these or other cases, the angle 146 is greater than about thirty degrees (30°) and less than about sixty degrees (60°). In at least some cases, the angle 146 is about forty-five degrees (45°).

The mounting system 112 may be used to mount a mountable device 102 to a structure, such as a pole 104. To do so, the bracket 114, 114a of the mounting system 112 is aligned on and secured to the structure. Where the bracket 114, 114a is a multi-member bracket as disclosed above, the side members 134, 136 of the bracket 114, 114a define apertures 118 sized and shaped to receive a first binding mechanism 120, such as a strap. Accordingly, the binding mechanism 120 is passed through the apertures 118 and wrapped around the structure so as to secure the bracket 114, 114a to the structure and allow the binding teeth 116 of the bracket 114, 114a to engage or grip the structure. The mountable device 102 is positioned upon the mating element 130 of the bracket's base member 132 and a second binding mechanism 124, such as a bolt, is optionally used to removably secure the mountable device 102 to the bracket 114, 114a.

The mounting system 112 may form part of a larger system that includes a pole 104, a streetlight luminaire 106 coupled to the pole 104, and a mountable device 102 electrically coupled to the streetlight luminaire 106. The electrical coupling may, for example, include a conductive conduit 110, and the electrical coupling may be from the mountable device 102 directly to the streetlight luminaire 106 or to a smart controller 108. In such a system, a mounting bracket 114 is fixedly secured to the pole 104 such that at least some of the bracket's binding teeth 116 are in direct contact with the pole 104, which help keep the bracket 114 from rotating, advancing closer to the ground, or moving in other ways. The mounting bracket 114 defines at least one aperture 118, which receives a first binding mechanism 120 that binds the mounting bracket 114 to the pole 104. A mating device 130 of the bracket 114, 114a (e.g., a "tab") receives the mountable device 102, and an optional second binding mechanism 124 removably secures the mountable device 102 to the bracket 114, 114a.

Having now set forth certain embodiments, further clarification of certain terms used herein may be helpful to providing a more complete understanding of that which is considered inventive in the present disclosure.

In the embodiments of present disclosure, one or more particular structures are arranged to bind mountable devices 102 to structures, such as utility poles 104. The various components and devices of the embodiments are interchangeably described herein as "coupled," "connected," "attached," and the like. It is recognized that once assembled, the mountable devices are suitably attached to the utility pole to prevent or reduce damage, disassembly, separation, and the like from storms or other environmental causes, vandalism, and the like. The materials and the bonds formed at the point where two or more structures are joined in the present embodiments are mechanically, electrically, or otherwise secure to an industrially acceptable level.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a bracket 114, 114a may be described as being formed or otherwise oriented "substantially vertical," In these cases, a bracket 114, 114a that is oriented exactly vertical is oriented along a "Z" axis that is normal (i.e., 90 degrees or at right angle) to a plane formed by an "X" axis and a "Y" axis. Different from the exact precision of the term, "vertical," the use of "substantially" to modify the characteristic permits a variance of the "vertical" characteristic by up to 30 percent. Accordingly, a bracket 114, 114a that is oriented "substantially vertical" includes brackets 114, 114a oriented between 63 degrees and 117 degrees. A bracket 114, 114a that is oriented at 45 degrees of an X-Y plane, however, is not mounted "substantially vertical." As another example, a bracket 114, 114a having a particular linear dimension of "between about three (3) inches and five (5) inches" includes such devices in which the linear dimension varies by up to 30 percent. Accordingly, the particular linear dimension of the bracket 114, 114a may be between one point five (1.5) inches and six point five (6.5) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, the words "include," "includes" and "including" are deemed to be followed by the words "without limitation," and except where a proper context requires, the word "or" is not exclusive.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The mounting device systems described in the present disclosure provide several technical effects and advances to the field of utility-provided power, telecommunications, streetlighting and other industries. Technical effects and benefits include the ability to securely couple mountable devices 102 to utility poles 104 in a manner that provides quick, efficient, installation, maintenance, service, and replacement.

The various embodiments described above can be combined to provide further embodiments. Various features of the embodiments are optional, and features of one embodiment may be suitably combined with other embodiments. Aspects of the embodiments can be modified, if necessary to employ concepts of the various patents, application and publications to provide yet further embodiments.

Example A-1 is a mounting device to secure a mountable device to a vertically standing utility pole, the mounting device, comprising a bracket having a generally rectangular shape; a plurality of binding teeth formed in the bracket, the plurality of binding teeth arranged to contact the vertically standing utility pole when the bracket is installed; at least one aperture arranged to receive a first binding mechanism, the first binding mechanism arranged to fixedly secure the bracket to the vertically standing utility pole when the bracket is installed; at least one structure arranged to receive the mountable device; and a second binding mechanism, the second binding mechanism arranged to removably secure the mountable device to the bracket.

Example A-2 may include the subject matter of Example A-1 and alternatively or additionally any other example herein, wherein the mountable device includes at least one of an air quality sensor, an environmental sensor, a motion detection sensor, a water sensor, an orientation sensor (e.g., tilt), a microphone, and other such devices.

Example A-3 may include the subject matter of any of Examples A-1 to A-2, and alternatively or additionally any other example herein, wherein the bracket has a first member with a generally rectangular shape, a second member integrated with a first elongated portion of the first member, and a third member integrated with a second elongated portion of the first member.

Example A-4 may include the subject matter of any of Examples A-1 to A-3, and alternatively or additionally any other example herein, wherein the second and third members have a second generally rectangular shape.

Example A-5 may include the subject matter of any of Examples A-1 to A-4, and alternatively or additionally any other example herein, wherein the second and third members are integrated on opposing elongated edges of the first member.

Example A-6 may include the subject matter of any of Examples A-1 to A-5, and alternatively or additionally any other example herein, wherein the first, second, and third members are formed from a single piece of material.

Example A-7 may include the subject matter of any of Examples A-1 to A-6, and alternatively or additionally any other example herein, wherein the first, second, and third members are each formed from a separate and distinct piece of material.

Example A-8 may include the subject matter of any of Examples A-1 to A-7, and alternatively or additionally any other example herein, wherein the second and third members are integrated at an angle offset from the first member by greater than about zero degrees (0°) and less than about ninety degrees (90°).

Example A-9 may include the subject matter of any of Examples A-1 to A-8, and alternatively or additionally any other example herein, wherein the second and third members are integrated at an angle offset from the first member by greater than about fifteen degrees (15°) and less than about seventy-five degrees (75°).

Example A-10 may include the subject matter of any of Examples A-1 to A-9, and alternatively or additionally any other example herein, wherein the second and third members are integrated at an angle offset from the first member by greater than about thirty degrees (30°) and less than about sixty degrees (60°).

Example A-11 may include the subject matter of any of Examples A-1 to A-10, and alternatively or additionally any other example herein, wherein an elongated edge of each of the second and third members has a radius.

Example A-12 may include the subject matter of any of Examples A-1 to A-11, and alternatively or additionally any other example herein, wherein an elongated edge of each of the second and third members has a radius of between about one inch (1 in.) and about fourteen inches (14 in.).

Example A-13 may include the subject matter of any of Examples A-1 to A-12, and alternatively or additionally any other example herein, wherein an elongated edge of each of the second and third members has a radius of between about two inches (2 in.) and about four inches (4 in.).

Example A-14 may include the subject matter of any of Examples A-1 to A-13, and alternatively or additionally any other example herein, wherein the bracket is formed from a single piece of material.

Example A-15 may include the subject matter of any of Examples A-1 to A-14, and alternatively or additionally any other example herein, wherein the bracket is stamped, pressed, bent, or machined from a single piece of material.

Example A-16 may include the subject matter of any of Examples A-1 to A-15, and alternatively or additionally any other example herein, wherein the bracket includes at least one recessed well.

Example A-17 may include the subject matter of any of Examples A-1 to A-16, and alternatively or additionally any other example herein, wherein the at least one recessed well includes at least one cable pass-through.

Example A-18 may include the subject matter of any of Examples A-1 to A-17, and alternatively or additionally any other example herein, wherein the at least one recessed well includes the at least one aperture arranged to receive the first binding mechanism.

Example A-19 may include the subject matter of any of Examples A-1 to A-18, and alternatively or additionally any other example herein, wherein the at least one aperture arranged to receive the first binding mechanism includes at least two apertures.

Example A-20 may include the subject matter of any of Examples A-1 to A-19, and alternatively or additionally any other example herein, wherein the at least one aperture arranged to receive the first binding mechanism includes at least four apertures.

Example A-21 may include the subject matter of any of Examples A-1 to A-20, and alternatively or additionally any other example herein, wherein the at least one aperture arranged to receive the first binding mechanism includes six apertures.

Example A-22 may include the subject matter of any of Examples A-1 to A-21, and alternatively or additionally any other example herein, wherein the at least one aperture arranged to receive the first binding mechanism includes apertures of different sizes.

Example A-23 may include the subject matter of any of Examples A-1 to A-22, and alternatively or additionally any other example herein, wherein the at least one aperture arranged to receive the first binding mechanism includes apertures of different shapes.

Example A-24 may include the subject matter of any of Examples A-1 to A-23, and alternatively or additionally any other example herein, wherein the at least one aperture arranged to receive the first binding mechanism includes apertures arranged to receive a first banding strap and a second banding strap.

Example A-25 may include the subject matter of any of Examples A-1 to A-24, and alternatively or additionally any other example herein, wherein the at least one aperture arranged to receive the first binding mechanism includes apertures arranged to receive a single banding strap.

Example A-26 may include the subject matter of any of Examples A-1 to A-25, and alternatively or additionally any other example herein, wherein the at least one aperture arranged to receive the first binding mechanism includes at least one aperture arranged to receive a threaded binding mechanism.

Example A-27 may include the subject matter of any of Examples A-1 to A-26, and alternatively or additionally any other example herein, wherein the at least one aperture arranged to receive the first binding mechanism includes at least one aperture arranged to receive a screw.

Example A-28 may include the subject matter of any of Examples A-1 to A-27, and alternatively or additionally any other example herein, wherein the plurality of teeth are formed on the second and third members.

Example A-29 may include the subject matter of any of Examples A-1 to A-28, and alternatively or additionally any other example herein, wherein the plurality of teeth includes at least four teeth.

Example A-30 may include the subject matter of any of Examples A-1 to A-29, and alternatively or additionally any other example herein, wherein the bracket is formed from a single piece of material.

Example A-31 may include the subject matter of any of Examples A-1 to A-30, and alternatively or additionally any other example herein, wherein the bracket is formed, at least in part, from steel, aluminum, plastic, or a composite.

Example A-32 may include the subject matter of any of Examples A-1 to A-31, and alternatively or additionally any other example herein, wherein the bracket comprises at least one bubble level.

Example A-33 may include the subject matter of any of Examples A-1 to A-32, and alternatively or additionally any other example herein, wherein the bracket comprises at least one directional legend.

Example A-34 may include the subject matter of any of Examples A-1 to A-33, and alternatively or additionally any other example herein, wherein the at least one directional legend comprises at least one compass rose.

Example A-35 may include the subject matter of any of Examples A-1 to A-34, and alternatively or additionally any other example herein, wherein the at least one directional legend comprises at least one directional arrow.

Example A-36 may include the subject matter of any of Examples A-1 to A-35, and alternatively or additionally any other example herein, wherein the utility pole is substantially formed of wood, fiberglass, concrete, steel, galvanized steel, or aluminum.

Example A-37 may include the subject matter of any of Examples A-1 to A-36, and alternatively or additionally any other example herein, wherein the utility pole is arranged to support at least one of electric power lines, cable multimedia lines, telephone lines, a luminaire, and a support for a luminaire.

Example A-38 may include the subject matter of any of Examples A-1 to A-37, and alternatively or additionally any other example herein, wherein the at least one structure arranged to receive the mountable device is a tab integrated with the bracket.

Example A-39 may include the subject matter of any of Examples A-1 to A-38, and alternatively or additionally any other example herein, wherein the tab integrated with the bracket protrudes from the bracket in a direction away from the vertically standing utility pole.

Example A-40 may include the subject matter of any of Examples A-1 to A-39, and alternatively or additionally any other example herein, wherein the tab integrated with the bracket is between about one quarter inch (0.25 in.) wide and about two inches (2 in.) wide.

Example A-41 may include the subject matter of any of Examples A-1 to A-40, and alternatively or additionally any other example herein, wherein the tab integrated with the bracket is between about one quarter inch (0.25 in.) tall and about two inches (2 in.) tall.

Example A-42 may include the subject matter of any of Examples A-1 to A-41, and alternatively or additionally any other example herein, wherein the tab integrated with the bracket protrudes at an angle of between about ten degrees (10°) from vertical and about forty-five degrees (45°) from vertical.

Example A-43 may include the subject matter of any of Examples A-1 to A-42, and alternatively or additionally any other example herein, wherein the at least one structure arranged to receive the mountable device is an aperture.

Example A-44 may include the subject matter of any of Examples A-1 to A-43, and alternatively or additionally any other example herein, wherein the second binding mechanism is a threaded aperture arranged to receive a certain type of bolt.

Example A-45 may include the subject matter of any of Examples A-1 to A-44, and alternatively or additionally any other example herein, wherein the second binding mechanism is a structure that protrudes from the bracket.

Example A-46 may include the subject matter of any of Examples A-1 to A-45, and alternatively or additionally any other example herein, wherein the second binding mechanism is a threaded member arranged to first receive the mountable device and then receive a threaded nut structure.

Example B-1 is a method to secure a mountable device to a vertically standing utility pole; the method, comprising aligning a mounting device on the vertically standing utility pole, the mounting device having a bracket having a generally rectangular shape; a plurality of binding teeth formed in the bracket; at least one aperture arranged to receive a first binding mechanism; at least one structure arranged to receive the mountable device; and a second binding mechanism arranged to removably secure the mountable device to the bracket; securing the bracket to the vertically standing utility pole such that at least some of the plurality of binding teeth are in direct contact with the vertically standing utility pole; and removably securing the mountable device to the vertically standing utility pole via the second binding mechanism.

Example C-1 is a system, comprising a vertically standing utility pole; a streetlight luminaire coupled to the vertically standing utility pole; a mountable device electrically coupled to the streetlight luminaire; and a mounting device fixedly secured to the vertically standing utility pole, the mounting device having: a generally rectangular bracket; a plurality of binding teeth formed in the generally rectangular bracket, wherein at least some of the plurality of binding teeth are in direct contact with the vertically standing utility pole; at least one aperture receiving a first binding mechanism that is binding the mounting device to the vertically standing utility pole; at least one structure receiving the mountable device; and a second binding mechanism that is removably securing the mountable device to the bracket.

Example C-2 may include the subject matter of Example C-1, and alternatively or additionally any other example herein, wherein the electrical coupling includes at least one power conduit.

Example C-3 may include the subject matter of any of Examples C-1 to C-2, and alternatively or additionally any other example herein, wherein the electrical coupling includes at least one power conduit and at least one communications conduit.

Example C-4 may include the subject matter of any of Examples C-1 to C-3, and alternatively or additionally any other example herein, wherein the at least one power conduit is arranged shared with at least one conduit arranged to communicate via a digital addressable lighting interface (DALI) protocol.

Example C-5 may include the subject matter of any of Examples C-1 to C-4, and alternatively or additionally any other example herein, wherein the at least one communications conduit is arranged for communication via a digital addressable lighting interface (DALI) protocol.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

What is claimed is:

1. A mounting bracket comprising:
    a base member defining at least a first edge portion and a second edge portion, the first edge portion being separated from the second edge portion by a width of the base member, each of the first edge portion and the second edge portion extending a length of the base member;
    a first side member attached to the first edge portion of the base member along the length of the base member, the first side member including an exposed edge and extending away from the base member at a first flared angle that is greater than zero degrees and less than ninety degrees, wherein the exposed edge of the first side member is arched at a first radius along the length of the base member; and a second side member attached to the second edge portion of the base member along the length of the base member, the second side member including an exposed edge and extending away from the base member at a second flared angle that is greater than zero degrees and less than ninety degrees, wherein the exposed edge of the second side member is arched at a second radius along the length of the base member.

2. The mounting bracket of claim 1, further comprising: a plurality of binding teeth.

3. The mounting bracket of claim 2, wherein exposed corners of the exposed edge of the first side member and exposed corners of the exposed edge of the second side member form the plurality of binding teeth.

4. The mounting bracket of claim 1, wherein each of the first side member and the second side member defines at least one aperture sized and shaped to receive at least part of a binding mechanism usable to secure the first and second side members to a structure.

5. The mounting bracket of claim 1, wherein the base member defines at least one aperture sized and shaped to receive a binding mechanism usable to removably secure a mountable device to the base member.

6. The mounting bracket of claim 1, wherein the base member includes a mating element arranged to receive a mountable device.

7. The mounting bracket of claim 6, wherein the mating element is a tab.

8. The mounting bracket of claim 1, wherein the base member, the first side member, and the second side member are formed from a single piece of material.

9. The mounting bracket of claim 1, wherein the first flared angle and the second flared angle are approximately equal.

10. The mounting bracket of claim 1, wherein the first radius and the second radius are approximately equal.

11. The mounting bracket of claim 1, wherein each of the first radius and the second radius is in a range of about one inch to about fourteen inches.

12. A mounting system comprising:
a binding mechanism; and
a bracket including:
a base member defining at least a first edge portion and a second edge portion, the first edge portion being separated from the second edge portion by a width of the base member, each of the first edge portion and the second edge portion extending a length of the base member;
a first side member attached to the first edge portion of the base member along the length of the base member, the first side member including an exposed edge and extending away from the base member at a first flared angle that is greater than zero degrees and less than ninety degrees, wherein the exposed edge of the first side member is arched at a first radius along the length of the base member, the first side member further defining a first aperture sized and shaped to receive at least part of the binding mechanism; and
a second side member attached to the second edge portion of the base member along the length of the base member, the second side member including an exposed edge and extending away from the base member at a second flared angle that is greater than zero degrees and less than ninety degrees, wherein the exposed edge of the second side member is arched at a second radius along the length of the base member, the second side member further defining a second aperture sized and shaped to receive at least part of the binding mechanism.

13. The mounting system of claim 12, wherein the base member of the bracket defines at least one aperture, the mounting system further comprising:
a second binding mechanism sized and shaped to be received by the at least one aperture of the base member, the second binding mechanism being usable to removably secure a mountable device to the base member.

14. The mounting system of claim 12, wherein the binding mechanism includes a strap and wherein the first aperture and the second aperture are sized and shaped to receive the strap.

15. The mounting system of claim 12, wherein the bracket further includes a plurality of binding teeth.

16. The mounting system of claim 15, wherein exposed corners of the exposed edge of the first side member and exposed corners of the exposed edge of the second side member form the plurality of binding teeth.

17. The mounting system of claim 12, wherein the base member of the bracket includes a mating element arranged to receive a mountable device.

18. A mounting system comprising:
a first binding mechanism;
a bracket including:
a base member defining at least one aperture, a first edge portion and a second edge portion, the first edge portion being separated from the second edge portion by a width of the base member, each of the first edge portion and the second edge portion extending a length of the base member;
a first side member attached to the first edge portion of the base member along the length of the base member, the first side member including an exposed edge and extending away from the base member at a first flared angle that is greater than zero degrees and less than ninety degrees, wherein the exposed edge of the first side member is arched at a first radius along the length of the base member, the first side member further defining a first aperture sized and shaped to receive at least part of the first binding mechanism;
a second side member attached to the second edge portion of the base member along the length of the base member, the second side member including an exposed edge and extending away from the base member at a second flared angle that is greater than zero degrees and less than ninety degrees, wherein the exposed edge of the second side member is arched at a second radius along the length of the base member, the second side member further defining a second aperture sized and shaped to receive at least part of the first binding mechanism; and
a plurality of binding teeth; and
a second binding mechanism sized and shaped to be received by the at least one aperture of the base member, the second binding mechanism being usable to removably secure a mountable device to the base member.

19. The mounting system of claim 18, wherein exposed corners of the exposed edge of the first side member and exposed corners of the exposed edge of the second side member form the plurality of binding teeth.

20. The mounting system of claim 18, wherein the base member of the bracket includes a mating element arranged to receive the mountable device.

\* \* \* \* \*